United States Patent [19]

Harris

[11] Patent Number: 5,535,502
[45] Date of Patent: Jul. 16, 1996

[54] METHOD FOR MAKING AN EXPLOSIVE SEPARATION SYSTEM

[75] Inventor: Gary N. Harris, Manassas, Va.

[73] Assignee: Orbital Sciences Corporation, Dulles, Va.

[21] Appl. No.: 300,834

[22] Filed: Sep. 2, 1994

Related U.S. Application Data

[62] Division of Ser. No. 970,363, Nov. 2, 1992, Pat. No. 5,390,606.

[51] Int. Cl.⁶ ................................................ B23P 17/00
[52] U.S. Cl. ............................................................ 29/527.1
[58] Field of Search .................................. 29/433, 527.1, 29/623

[56] References Cited

U.S. PATENT DOCUMENTS

| | | |
|---|---|---|
| 3,185,090 | 5/1965 | Weber . |
| 3,373,686 | 3/1968 | Blain et al. . |
| 3,486,410 | 12/1969 | Drexelius et al. . |
| 3,698,281 | 10/1972 | Brandt et al. . |
| 4,022,129 | 5/1977 | Day et al. . |
| 4,137,848 | 2/1979 | Cunha . |
| 4,685,376 | 8/1987 | Noel et al. . |
| 4,742,773 | 5/1988 | Bartholomew et al. . |
| 5,010,823 | 4/1991 | Morrison . |
| 5,109,749 | 5/1992 | Olcer . |
| 5,123,356 | 6/1992 | Brooks et al. . |
| 5,129,306 | 7/1992 | Fauvel . |
| 5,331,894 | 7/1994 | Wassell et al. ................ 102/275.11 |
| 5,392,684 | 2/1995 | Renfro et al. ........................ 102/378 |

FOREIGN PATENT DOCUMENTS

| | | |
|---|---|---|
| 0246958 | 11/1987 | European Pat. Off. . |
| 0472453 | 2/1992 | European Pat. Off. . |
| 82522 | 1/1964 | France . |

OTHER PUBLICATIONS

"Confined Explosive Separation System" by E. Raymond Lake, McDonnell Aircraft Co. MDC 69–021 Jun., 1969.

*Primary Examiner*—David P. Bryant
*Attorney, Agent, or Firm*—Jenner & Block

[57] ABSTRACT

An improved explosively operated separation joint as well as a process for manufacturing it are disclosed. In the present invention, a hollow-form extrusion is used to provide both sides of a separation joint, each side being attached to both of the two structures. Each end of the joint is attached to a respective one of the two structures. A stainless steel tube is inserted into the hollow portion of the extrusion. The extrusion then is rolled to form a portion of a ring. An explosive core covered by an elastomeric sheath is inserted into the length of the tube. The ends of the ring then are connected to and sealed by an initiation manifold. The manifold provides an interface between each of two flexible confined detonating cords ("FCDCs") with a respective end of the explosive core. The manifold includes a barrier between the ends of the explosive core and the two FCDCs that prevents sympathetic damage to either end of the explosive core and the associated FCDC by the detonation of the other.

10 Claims, 4 Drawing Sheets

METHOD FOR MAKING AN EXPLOSIVE SEPARATION SYSTEM

This is a division of application Ser. No. 07/970,363 filed Nov. 2, 1992, now U.S. Pat. No. 5,390,606.

BACKGROUND OF THE INVENTION

The invention relates to an explosive separation system for a variety of applications, and more particularly, to a reliable, clean operating and low cost separation joint made by an extrusion and rolling process. The extrusion process facilitates the manufacture of a single frangible joint member that replaces a pair of rings in prior art separation systems, thereby simplifying manufacture and assembly with the attendant cost savings. Explosive separation systems are most commonly used for stage and payload separation in various space applications.

Existing explosive separation joints are costly to manufacture. The primary sources of these costs are the precision machined rings they employ and the tedious assembly process required. For example, the explosive system disclosed in U.S. Pat. No. 3,698,281 requires the manufacture of two separate precision machined rings 50 and 52 (shown in cross section in FIG. 3). After manufacture, the rings 50 and 52 are attached to the two sections to be joined, 54 and 56. One ring 52 is attached to the interior portion of sections 54 and 56, while the other ring 50 is attached to the exterior portion of sections 54 and 56. Each ring 50 and 52 has a recess, which together form a hollow portion 58 to receive an explosive core when the rings are assembled. The placement of the rings 50 and 52 has to be performed with great accuracy to ensure that an explosive core within the hollow portion 58 is properly positioned to completely separate sections 54 and 56 after detonation. Each ring 50 and 52 also has a notch 60 in the side opposite the recess, along which the rings 50 and 52 separate upon detonation of the explosive core. The thickness of the material between each notch 60 and the explosive core 62 must be controlled precisely in order to ensure that the explosion of core 12 will cause complete separation around the entire circumference of rings 50 and 52.

Typically in the prior art, the ends of the tube containing the explosive core are sealed using a "swaging" process in which a round mandrel projecting from a block is pulled inside the tube. This causes the tube to flare to match the mandrel and results in a tight fit between the manifold and the tube. The explosive core extends completely through the mandrel and block via a bore. The block is then attached to the tube by welding. In prior art joints, while the majority of the tube length is oval, the ends are left round to facilitate the foregoing attachment. Thus, the manufacture of the prior art joint required precision machined rings and their meticulous assembly with the explosive core and attachment to the structures to be separated.

By contrast, the present invention employs a single-piece, hollow-form extrusion containing an explosive core, rather than two separate plates or rings (one on the inboard side and one on the outboard side of the explosive core). The process of forming and attaching a single extrusion joint avoids the need for precisely machining and attaching two separate rings, which can be up to several feet in diameter. The joint of the present invention also comprises a new manifold that facilitates sealing the ends of the extrusion and initiating detonation of the explosive core. Thus, the extruded frangible joint of the present invention is superior to prior art joints employed in explosive separation systems.

OBJECT AND SUMMARY OF THE INVENTION

Thus, an object of the present invention is to provide a superior, reliable, and clean operating explosive separation system that is easier and less expensive to manufacture and assemble than prior art systems. The present invention accomplishes this object by using a single-piece extrusion having a hollow portion (which comprises a tube cavity), a pair of franging notches, one on either side opposite the hollow portion of the extrusion, and two attach flange portions for joining the two sections to be explosively separated. The two portions of the extrusion comprising the flanges are positioned on either end of the joint with the tube cavity between them. An inner stainless steel tube is inserted into the hollow portion of the extrusion. This tube contains the byproducts of the explosion after detonation, and can be eliminated in applications where avoiding contamination of the surrounding area is not important. The extrusion is then rolled into its final shape—e.g., an open ring if it is to be used to join two cylindrical portions of a spacecraft. The explosive core, a dual initiated linear explosive comprising a Mild Detonating Fuse (MDF), is placed in a rubber sleeve. Then the explosive core and rubber sleeve are pulled through the stainless steel tube in the hollow portion of the extrusion. Finally, an initiation manifold is attached to the tube ends to close the ring and seal the tube. Prior art mandrels are unsuitable for use with the frangible joint of the present invention, however, because in the joint of the present invention, since the tube is pulled through the oblong-hollow portion of the extrusion, the ends of the tube cannot be round. In the present invention a new manifold structure is attached to the tube ends by a crimping, bonding and clamping process. The initiation manifold of the present invention also has a barrier separating two chambers housing the respective ends of the explosive core, which prevents sympathetic damage to each opposing end of the linear charge.

The separation system is actuated by an electrical signal provided via the manifold to detonate the explosive core, as is known in the art. The explosion causes expansion of the stainless steel tube, which breaks the joint at the two notches to separate it into two parts.

DETAILED DESCRIPTION OF THE PREFERRED EMBODIMENT

Figure 1:
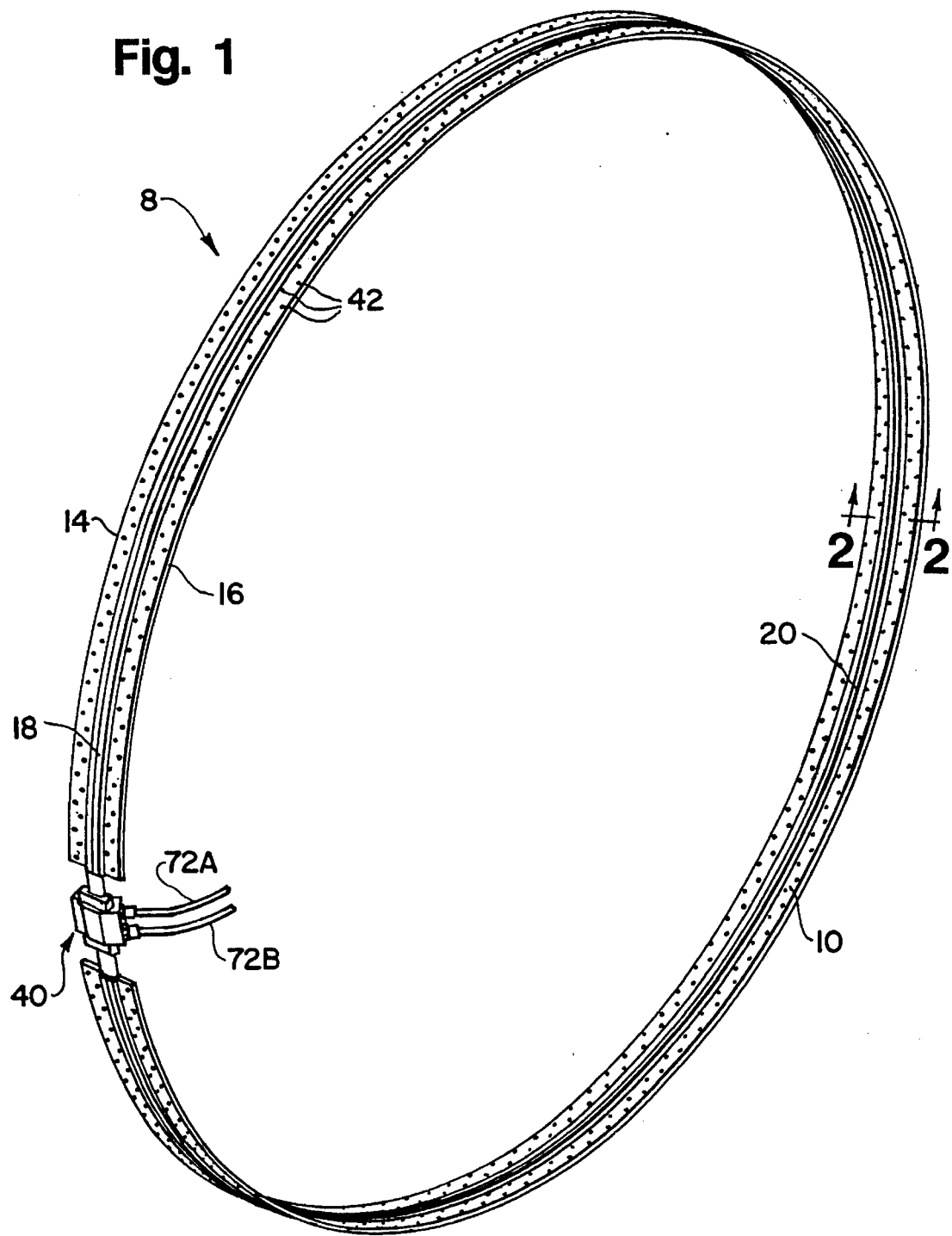
FIG. 1 is a perspective view of an extruded frangible joint of the present invention.
Figure 2:
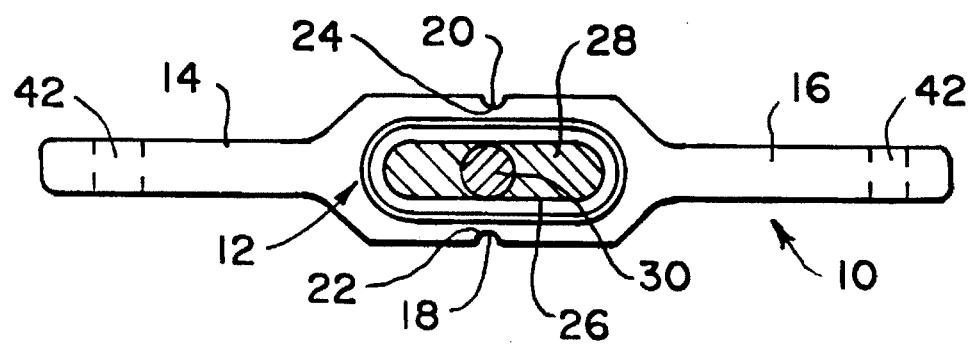
FIG. 2 is a section taken along the line 2—2 in FIG. 1 showing in cross section the hollow-form extrusion, stainless steel tube, rubber sheath and explosive core.
Figure 3:
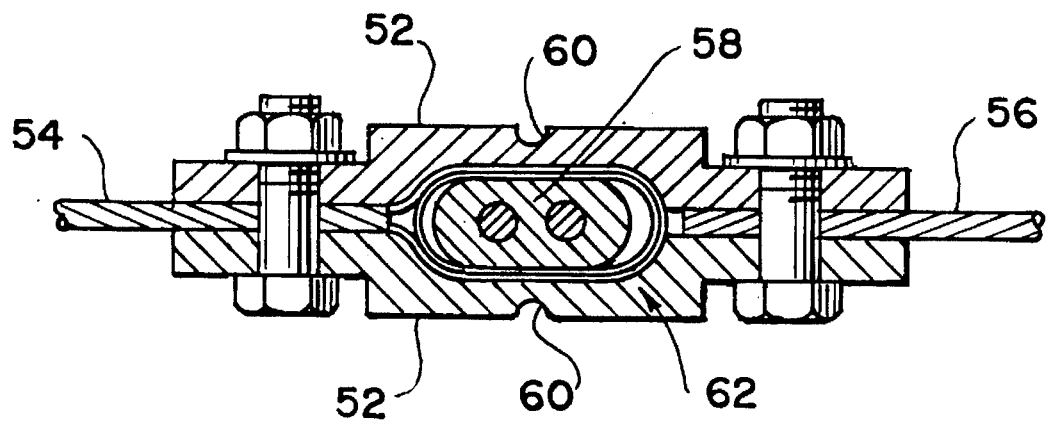
FIG. 3 is a cross section similar to FIG. 9, but of a prior art explosive separation system disclosed in U.S. Pat. No. 3,698,281.

Referring to FIGS. 1 and 2, an extrusion 10 is formed by extruding 6061 aluminum or other suitable material through a suitably shaped die (not shown) and heat treating it to temper it to the T6 condition. The die contains a centerpiece (not shown) having an oblong-shaped cross section. The centerpiece is cantilevered in order to create an oblong-shaped, hollow center portion 12 in the extrusion 10. The extrusion be also comprises two flanges 14 and 16 having holes 42 to provide means for attaching the extrusion 10 to the respective structures to be joined—e.g., two stages of a spacecraft. Extrusion 10 is the structural load carrying component of the frangible joint separation system e (as shown in FIG. 1). Two parallel separation grooves or notches 18 and 20, one on either side of the hollow portion 12, provide breakpoints 22 and 24, respectively, of reduced thickness on either side of hollow portion 12. These breakpoints 22 and 24 are the locations along which separation occurs after detonation of explosive core After the extrusion 10 has been formed, an elongated tube 26 is inserted into the hollow center portion 12. In the preferred embodiment, tube 26 is 304L (annealed condition) stainless steel and has an outside diameter of 0.625 inch and a wall thickness of 0.049 inch. The purpose of tube 26 is to contain the byproducts of the explosion after detonation of explosive core 30. In applications where contamination is not an issue, however, tube 26 can be omitted. After the tube 26 is inserted into hollow portion 12, the extrusion 10 is rolled into its desired shape—e.g., an open ring as shown in FIG. 1. To accommodate the manifold 40, after being rolled the tube 26 and extrusion are trimmed back by using, for example, a mill or handsaw and file.

The explosive core 30 comprises, for example, a Mild Detonating Fuse (MDF) consisting of hexanitrostilbene (HNS) inside an aluminum sheath which is drawn down to a nominal 23.25 grains/foot. The explosive core 30 is inserted into a sleeve 28 of extruded silicone rubber or other suitable material, which holds the explosive core 30 centered in the tube 26. A nominal space is provided between sleeve 28 and tube 26 to allow for manufacturing tolerances. The explosive core 30 and the rubber sleeve 28 are then pulled through the tube 26 and trimmed to the appropriate length, if necessary.

The frangible joint 8, comprising extrusion 10, sleeve 28, explosive core 30 and manifold 40, is now substantially as portrayed in FIG. 1. The final step required to complete the joint 8 is to attach the initiation manifold 40.

Figure 4:
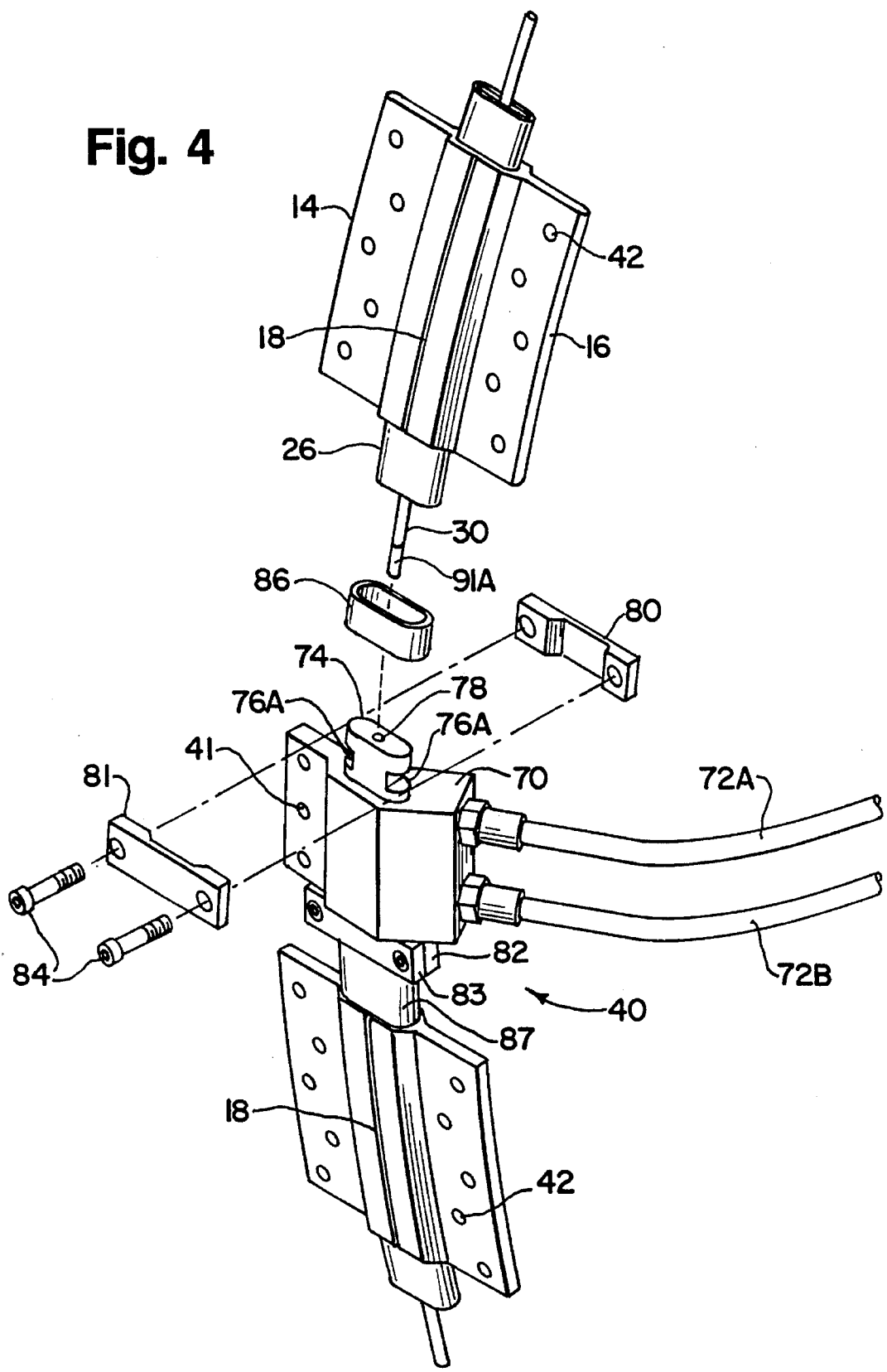
FIG. 4 is an exploded view of the manifold of the present invention and its attachment to the extruded frangible joint.
Figure 5:
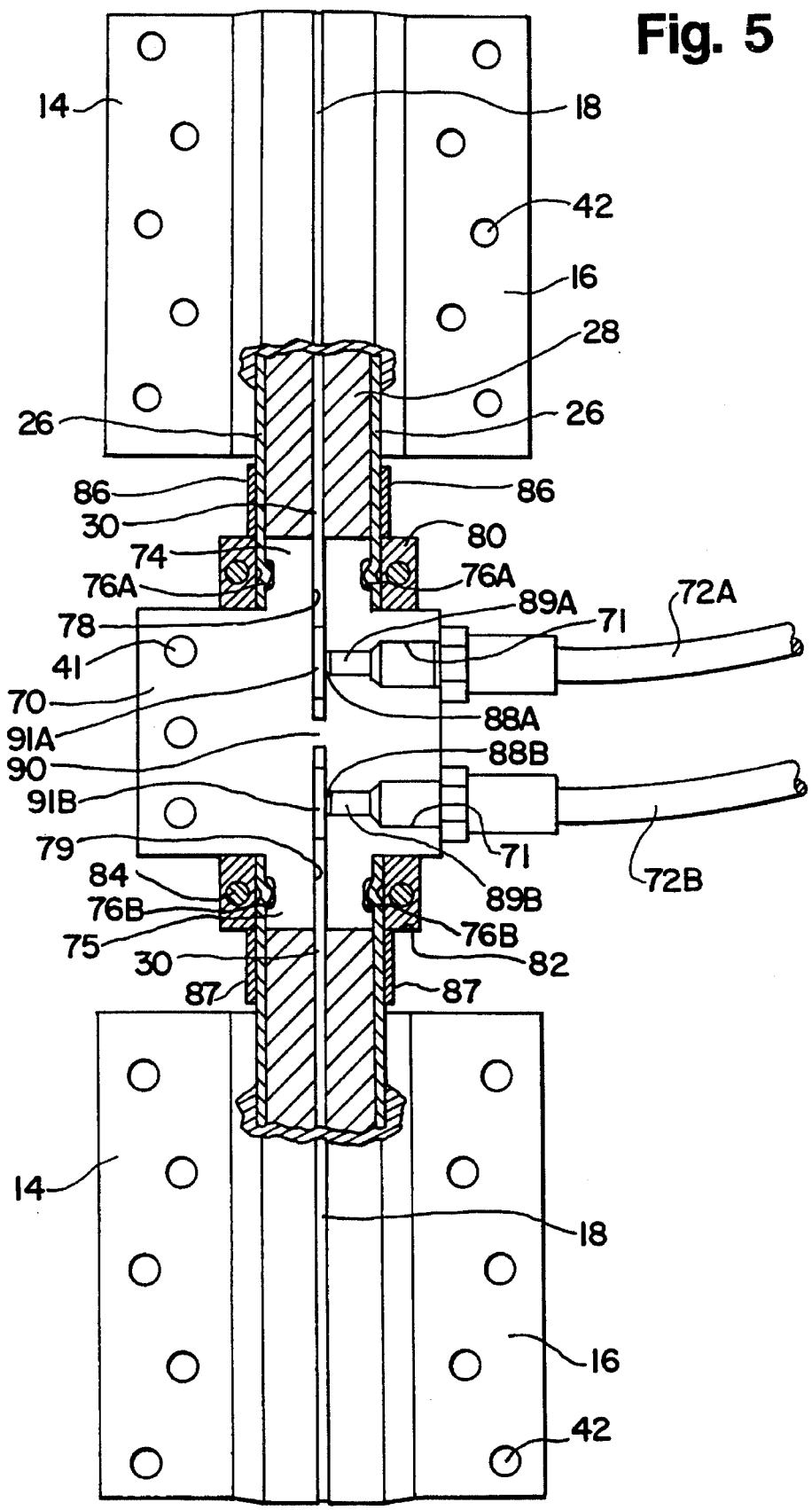
FIG. 5 is a partial cross section of the manifold area of the extruded frangible joint.

Prior art separation joints use tubes with round ends to attach to the manifold as noted above. Because tube 26 in the present invention must be pulled through the length of extrusion 12, the ends of tube 26 are oblong rather than round. Therefore, the present invention also comprises a new manifold 40 and method for attaching it to the end of tube 26. With reference to FIGS. 4 and 5, the initiation manifold comprises a machined stainless steel body 70 having a pair of threaded ports 71 for interfacing initiating Flexible Confined Detonating Cords (FCDCs) 72A and 72B, respectively, with each end of the HNS/aluminum MDF, i.e., explosive core 30. Alternatively, only one port 70 could be used to interface one FCDC with only one end of explosive core 30.

Two plug members 74 and 75, each having at least one crimping notch 76A and 76B (two in the preferred embodiment) in the side, extend outwardly in opposite directions from body 70. Plug members 74 and 75 have a cross section and are dimensioned so as to fit snugly inside the ends of tube 26. Manifold 40 includes co-axial bores 78 and 79 extending along the axis of plug members 74 and respectively, toward the center of manifold 40. The depth of each bore 78 and 79 is such that the two bores do not meet, leaving a barrier 90 of material between the ends of bores and 79. The diameter of bores 78 and 79 is selected to permit the ends of explosive core 30 to be inserted therein. Retaining sleeves 86 and 87 are inserted over the respective ends of tube 26, and serve to reinforce tube 26 against rupture in the area where it protrudes out of extrusion 10. The length of sleeve 28 is shorter than tube 26 such that there is a gap between each end of sleeve 28 and the corresponding end of tube 26 to permit plug members 74 and 75 to be inserted therein. The respective ends of explosive core 30 then are inserted into bores 78 and 79, respectively, as the respective ends of tube 26 are inserted over plug members 74 and 75, past crimping notches 76A and 76B. Tube 26 is secured to plug members 74 and 75 by crimping tube 26 near each end into crimping notches 76A and 76B. The crimped portions of tube 26 are retained in crimping notches 76A of plug member 74 by a clamp comprised of inboard member 80 and outboard member 81, which are held in position over the end of tube 26 and plug member 74 by fasteners 84 or other suitable means. One end of tube 26 is thereby secured to plug 74 of manifold 40. Similarly, crimped portions near the other end of tube 26 are retained incrimping notches 76B by a clamp comprised of inboard member 82 and outboard member 83, which are held in position by fasteners 84. Thus, the other end of tube 26 is secure to plug 75 of manifold 40. The foregoing arrangement also serves to seal the explosive core 30 within tube 26 and manifold 40. In the preferred embodiment, a suitable adhesive is used to bond the end of tube 26 to plugs 74 and 75 and to strengthen the attachment and provide a better seal. The initiation manifold 40 maintains the proper gap 88A and 88B between loaded receptor cups 91A and 91B at either end of explosive core 30 and the FCDC end tips 89A and 89B, respectively. Loaded receptor cups 91A and 91B are detonated by FCDC 72A and 72B, respectively, which in turn initiate detonation of the respective ends of explosive core 30. Loaded receptor cups 91A and 91B contain charge that serves to enhance detonation transfer from FCDCs 72A and 72B to the respective ends of explosive core 30.

In the preferred embodiment, the manifold 40 is designed to side-initiate the linear charge of explosive core 30 from either FCDC 72A or 72B in separate chambers comprised of bores 78 and 79 isolated from each other by a barrier 90. The separate chambers eliminate sympathetic damage to either end of explosive core 30 that might be caused by the detonation of the other end where the detonation of one end occurs slightly earlier than detonation of the other end.

The joint is attached to the two sections of spacecraft (not shown) to be joined using a plurality of fasteners (not shown) in holes 42. Manifold 40 is attached to one of the structures to be separated, for example, by fasteners (not shown) in holes 41, and it stays attached to that structure after the structures are separated. Upon detonation of the explosive core 30, the stainless steel tube 26 is forced outwardly so as to have a near circular cross section. The deformation of the tube 26 performs work on the interior of the extrusion 10 in the hollow portion 12. This causes cracking and then separation at the weaker breakpoints 22 and 24 in the extrusion be, which are located beneath separation notches 18 and 20, respectively. The tube 26 in combination with manifold 40, also serves to contain the byproducts of the explosion. Thus, a reliable, clean operating and low cost separation joint and a process for manufacturing it through an extrusion and rolling process have been demonstrated.

Whereas the present invention has been described with respect to specific embodiments thereof, it will be understood that various changes and modifications will be suggested to one skilled in the art and it is intended that the invention encompass such changes and modifications as fall within the scope of the appended claims.

What is claimed is:

1. A method for making a frangible joint comprising the steps of:

extruding a connecting member having a hollow portion throughout the length thereof and two parallel, linear grooves;

inserting a tube through the length of the hollow portion of the connecting member;

forming the connecting member into a final shape;

placing an explosive core in a flexible sleeve;

pulling the explosive core and flexible sleeve through the length of the connecting member via the hollow portion; and attaching an initiation manifold to the tube ends to seal the tube.

2. A method in accordance with claim 1 wherein said forming step comprises forming the connecting member into a portion of a ring.

3. A method in accordance with claim 2 wherein said forming step further comprises forming the connecting member by rolling.

4. A method in accordance with claim 1 wherein said attaching step comprises the steps of:

trimming the explosive core and the flexible sleeve to an appropriate length;

installing a receptor cup on each end of the explosive core;

inserting a retaining sleeve over each end of the tube;

placing the tube ends over plug members protruding from either side of the manifold;

crimping the tube ends into a notch on each plug member;

installing a clamp over each tube end to retain the crimped portion of the tube in the notch; and installing an end of a detonating cord in a port in the manifold in proximity to an end of the explosive core.

5. A method in accordance with claim 4 further comprising the step of applying adhesive on the plug members prior to the step of placing the tube ends over the plug members.

6. A method in accordance with claim 4 further comprising the step of installing clamps over the tube ends to retain the crimped portions of the tube in the notches.

7. A method in accordance with claim 1 wherein two detonating cords are used and an end of each detonating cord is installed in proximity to a respective end of the explosive core.

8. A method in accordance with claim 1 wherein said attaching step includes the step of retaining the tube over plug members protruding from either side of the manifold.

9. A method for making an explosive separation system for separating two structures comprising the steps of:

extruding a connecting member having a hollow portion throughout the length thereof and two parallel, linear grooves adjacent to the hollow portion;

forming the connecting member into a final shape;

placing an explosive core in a flexible sleeve;

pulling the explosive core and flexible sleeve through the length of the connecting member via the hollow portion; and attaching an initiation manifold to one of the structures to be separated with the initiation manifold being in communication with the explosive core.

10. A method for making an explosive separation system comprising the steps of:

extruding a connecting member having a hollow portion throughout the length thereof and two parallel, linear grooves adjacent to the hollow portion;

inserting a tube through the length of the hollow portion of the connecting member;

placing an explosive core in a flexible sleeve;

pulling the explosive core and the flexible sleeve through the length of the connecting member via the hollow portion;

attaching an initiation manifold to the tube ends to seal the tube; and forming the connecting member into a final shape.

* * * * *